United States Patent
Flik

(10) Patent No.: US 10,814,342 B2
(45) Date of Patent: Oct. 27, 2020

(54) IRRIGATION SPRINKLER COVER LATCH

(71) Applicant: The Toro Company, Bloomington, MN (US)

(72) Inventor: Günther Flik, Althengstett (DE)

(73) Assignee: The Toro Company, Bloomington, MN (US)

( * ) Notice: Subject to any disclaimer, the term of this patent is extended or adjusted under 35 U.S.C. 154(b) by 47 days.

(21) Appl. No.: 15/942,324

(22) Filed: Mar. 30, 2018

(65) Prior Publication Data
US 2018/0281007 A1 Oct. 4, 2018

Related U.S. Application Data

(60) Provisional application No. 62/479,175, filed on Mar. 30, 2017.

(51) Int. Cl.
*B05B 15/16* (2018.01)
*A01G 25/00* (2006.01)
*B05B 3/02* (2006.01)
*B05B 15/74* (2018.01)

(52) U.S. Cl.
CPC .............. *B05B 15/16* (2018.02); *A01G 25/00* (2013.01); *B05B 3/02* (2013.01); *B05B 15/74* (2018.02); *Y02A 40/237* (2018.01)

(58) Field of Classification Search
CPC ........... B05B 15/16; B05B 15/74; B05B 3/02; A01G 25/00; Y02A 40/237; Y10S 292/11; Y10T 292/096; Y10T 292/1022; Y10T 292/103; Y10T 292/0894; Y10T 292/0902; Y10T 24/45796

USPC .. 239/288, 288.3, 288.5, 200, 201, 203–205
See application file for complete search history.

(56) References Cited

U.S. PATENT DOCUMENTS

| | | | |
|---|---|---|---|
| 3,785,565 A * | 1/1974 | Perry | B05B 3/0431 |
| | | | 239/206 |
| 4,253,608 A | 3/1981 | Hunter | |
| 5,222,669 A | 6/1993 | Lawson | |
| 5,224,653 A | 7/1993 | Nelson et al. | |
| 5,409,168 A * | 4/1995 | Nelson | B05B 1/265 |
| | | | 239/222.11 |
| 5,829,480 A | 11/1998 | Smith | |
| 6,227,455 B1 | 5/2001 | Scott et al. | |
| 6,488,218 B1 | 12/2002 | Townsend et al. | |
| 7,669,649 B2 * | 3/2010 | Williams | E21B 33/085 |
| | | | 166/84.3 |
| 8,444,063 B2 | 5/2013 | Lichte et al. | |
| 9,138,768 B2 * | 9/2015 | Jahan | B05B 15/622 |
| 2008/0197213 A1 * | 8/2008 | Flashinski | A01M 1/205 |
| | | | 239/288.5 |
| 2010/0252392 A1 | 10/2010 | Yoshimura et al. | |
| 2012/0048393 A1 * | 3/2012 | Waters | B05B 15/00 |
| | | | 137/315.01 |

(Continued)

OTHER PUBLICATIONS

WIPO, U.S. International Search Authority, International Search Report and Written Opinion dated Jun. 25, 2018 in International Patent Application No. PCT/US2018/025572, 11 pages.

*Primary Examiner* — Qingzhang Zhou
(74) *Attorney, Agent, or Firm* — Inskeep IP Group, Inc.

(57) ABSTRACT

A latching mechanism for a sprinkler can be actuated from underneath the cover by the user's fingers. An elongated, horizontal, latch member slides radially inward and outward along the underside of the cover to either engage the cover to the sprinkler head or disengage the cover from the sprinkler head.

13 Claims, 10 Drawing Sheets

(56) References Cited

U.S. PATENT DOCUMENTS

2013/0036719 A1    12/2013  Baus
2013/0336719 A1*  12/2013  Baus .................. F16B 2/16
                                                                403/379.5
2014/0339333 A1*  11/2014  Wright ............... B05B 15/70
                                                                239/204
2017/0223905 A1    8/2017   Wright, III et al.

* cited by examiner

IRRIGATION SPRINKLER COVER LATCH

RELATED APPLICATIONS

This application claims priority to U.S. Provisional Application Ser. No. 62/479,175 filed Mar. 30, 2017 entitled Irrigation Sprinkler Cover Latch, which is hereby incorporated herein by reference in its entirety.

BACKGROUND OF THE INVENTION

Typically, sprinkler covers are fixed to the top of a nozzle assembly or a riser assembly via a screw or similar fixture, and therefore require access to the top of the cover to unscrew or otherwise access. However, some sprinklers include "cups" with dirt and grass, or layers of artificial turf mounted on the tops of the sprinkler cover to help blend into the surrounding turf; such as U.S. Pub. No. 20170223905 and U.S. Pat. No. 6,439,476 which are hereby incorporated herein by reference. These turf cups or artificial turf can greatly increase the difficulty of removing the sprinkler cover, since they are mounted directly on top of the location that the user must access to remove the cover.

SUMMARY OF THE INVENTION

In one embodiment, the present invention is directed to a latching mechanism for a sprinkler that can be actuated from underneath the cover by the user's fingers. An elongated, horizontal, latch member slides radially inward and outward along the underside of the cover to either engage the cover to the sprinkler head or disengage the cover from the sprinkler head.

In one embodiment, the latch member has an aperture with a first side having a relatively larger width/diameter and a second side having a relatively smaller width/diameter. Moving the latch member aligns either the first side or the second side with a second aperture through a base plate fixed to the bottom of the cover. By changing the size of the passage through both apertures, the passage can fit over a post on the top of the sprinkler head in an enlarged position and can be locked on to the post in a smaller position.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
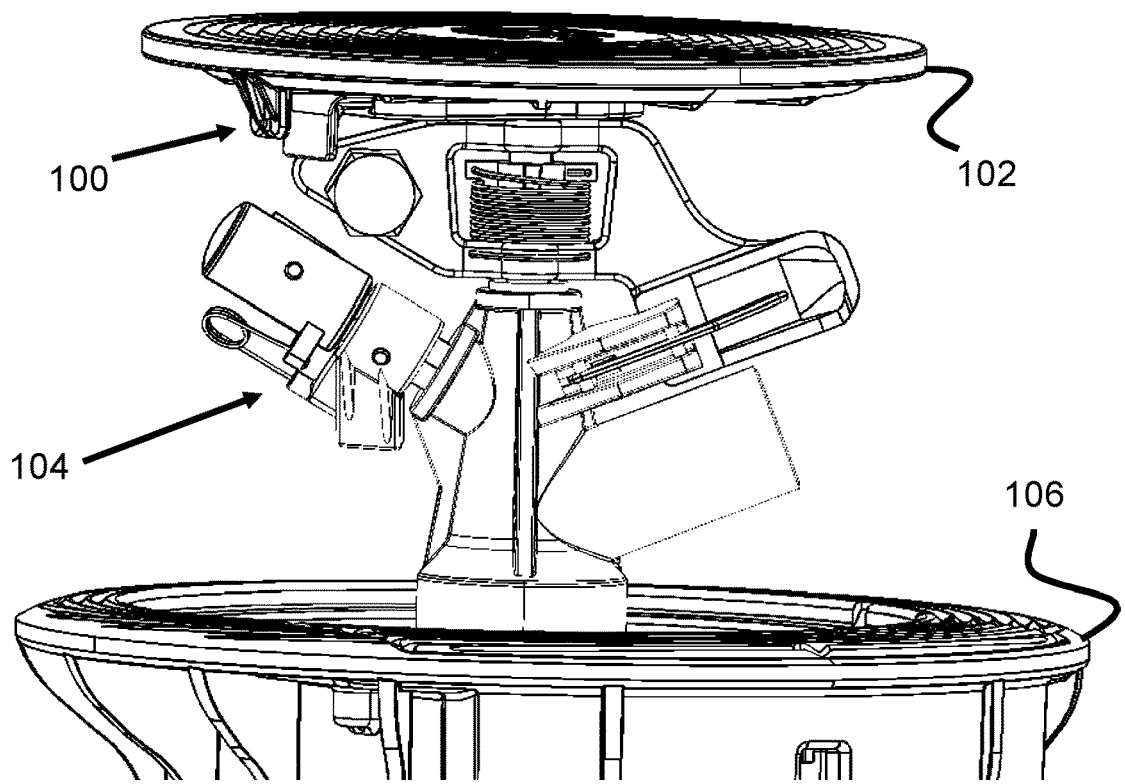
FIG. 1 is a side view of a sprinkler with a removable cover according to the present invention.
Figure 2:
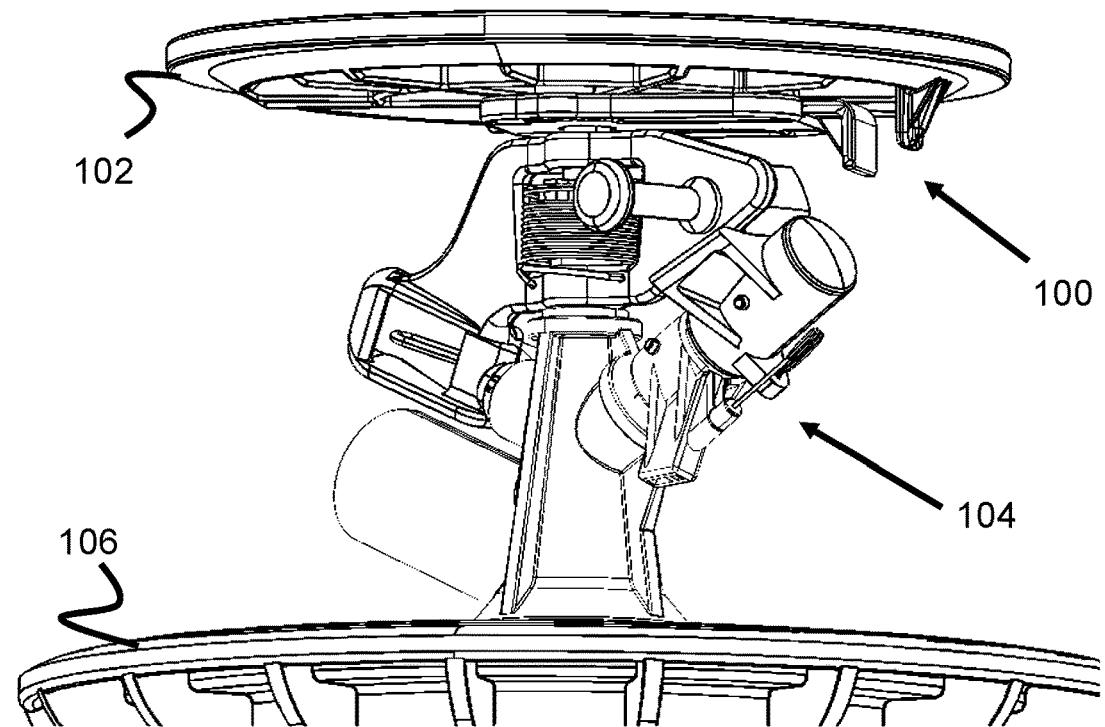
FIG. 2 is a side view of a sprinkler with a removable cover according to the present invention.
Figure 3:
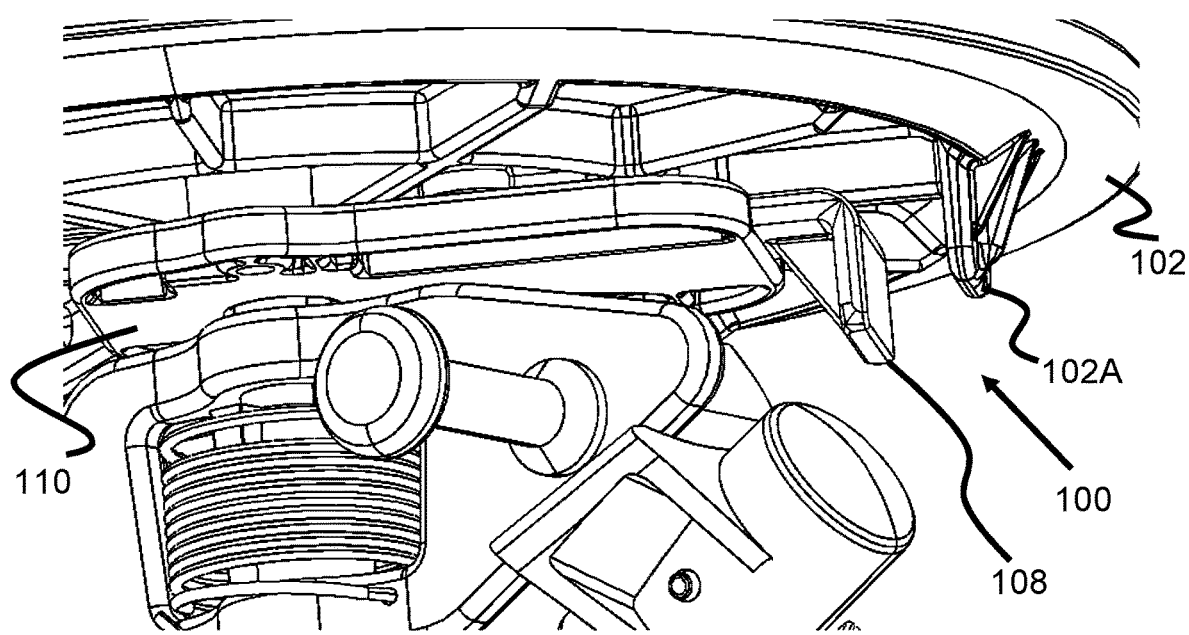
FIG. 3 is a side view of a sprinkler with a removable cover according to the present invention.
Figure 4:
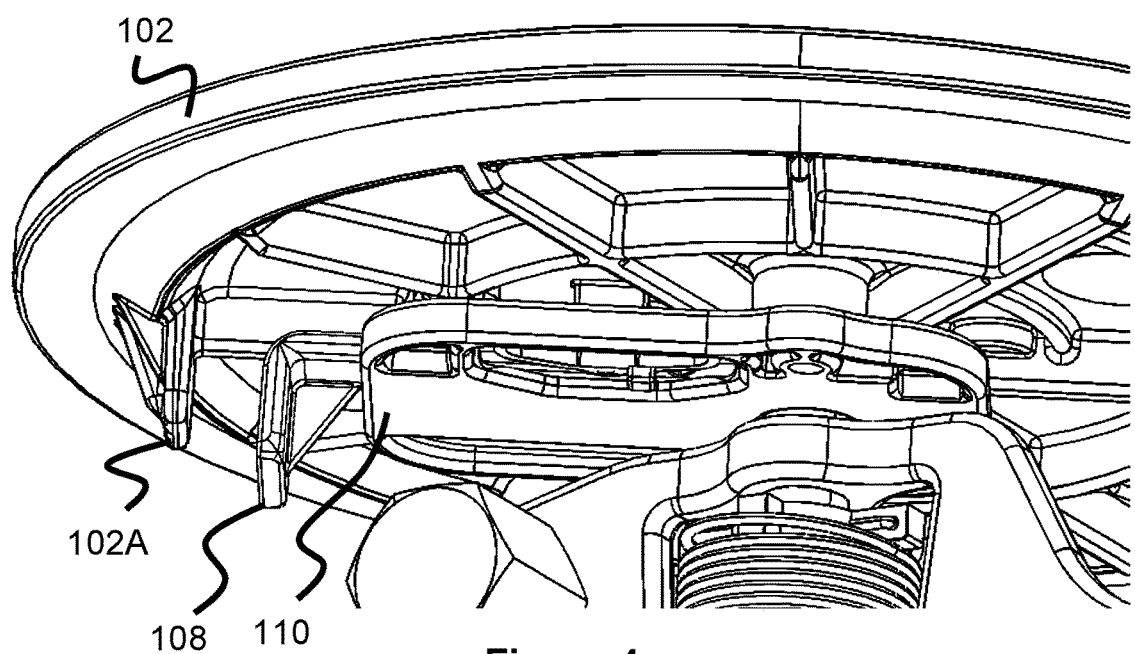
FIG. 4 is a side view of a sprinkler with a removable cover according to the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 20:
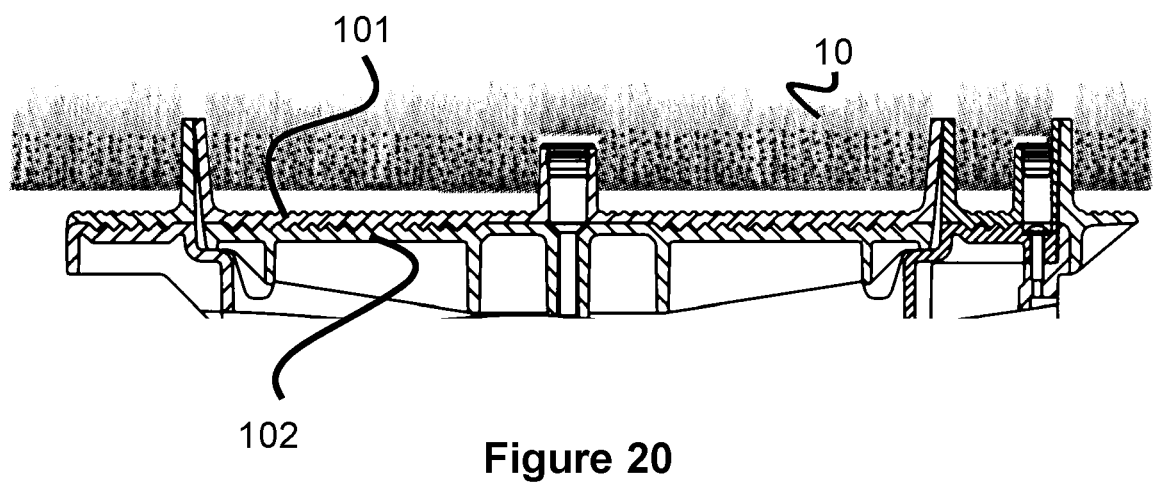
FIG. 20 is a view of a sprinkler cover with a turf cup according to the present invention.

FIG. 1 illustrates a typical nozzle assembly 104 (or riser) that pops up from the sprinkler body 106 during irrigation and moves down into the body 106 when irrigation stops. The nozzle assembly 104 typically includes a nozzle that is connected to a water supply so as to shoot out water while rotating through a preset In the prior art, a sprinkler cover 102 is fixed to the top of a nozzle assembly 104 via one or more screws or similar fixtures, and therefore require access to the top of the cover to unscrew or otherwise access. However, some sprinklers include cups with dirt and grass or artificial turf mounted on the top of the sprinkler cover to help blend into the surrounding turf. For example, FIG. 20 illustrates a cross sectional view of a turf cup 101 containing turf 10 and being mounted on a sprinkler cover 102. These turf cups 101 can greatly increase the difficulty of removing the sprinkler cover 102, since they are mounted directly on top of the location that the user must access to remove the cover.

Referring to FIGS. 1-17, the cover latch assembly 100 of the present invention allows the user to more easily remove a cover 102, especially if a turf cup 101 is present, by pulling a latch member 108, located underneath the cover 102; thereby detaching the cover 102 from the nozzle assembly 104. In this respect, the user can remove the cover 102 without the need for accessing the cover's top surface.

The cover latch assembly 100 primarily comprises a base plate fixture 110 (seen best in FIGS. 12 and 13) that is fixed to an underside of the cover 102, and the latch member 108 (seen best in FIGS. 10 and 11) that is positioned between the fixture 110 and the cover 102 to slide parallel to the top surface of the cover 102. Both the base plate fixture 110 and the latch member 108 have apertures 110A and 108A, respectively, that are partially aligned with each other, depending on the position of the latch member 108. Aperture 110A is generally circular, while aperture 108A has a first end with a larger diameter/width and a second end with a smaller diameter/width relative to the opposite end.

Figure 7:
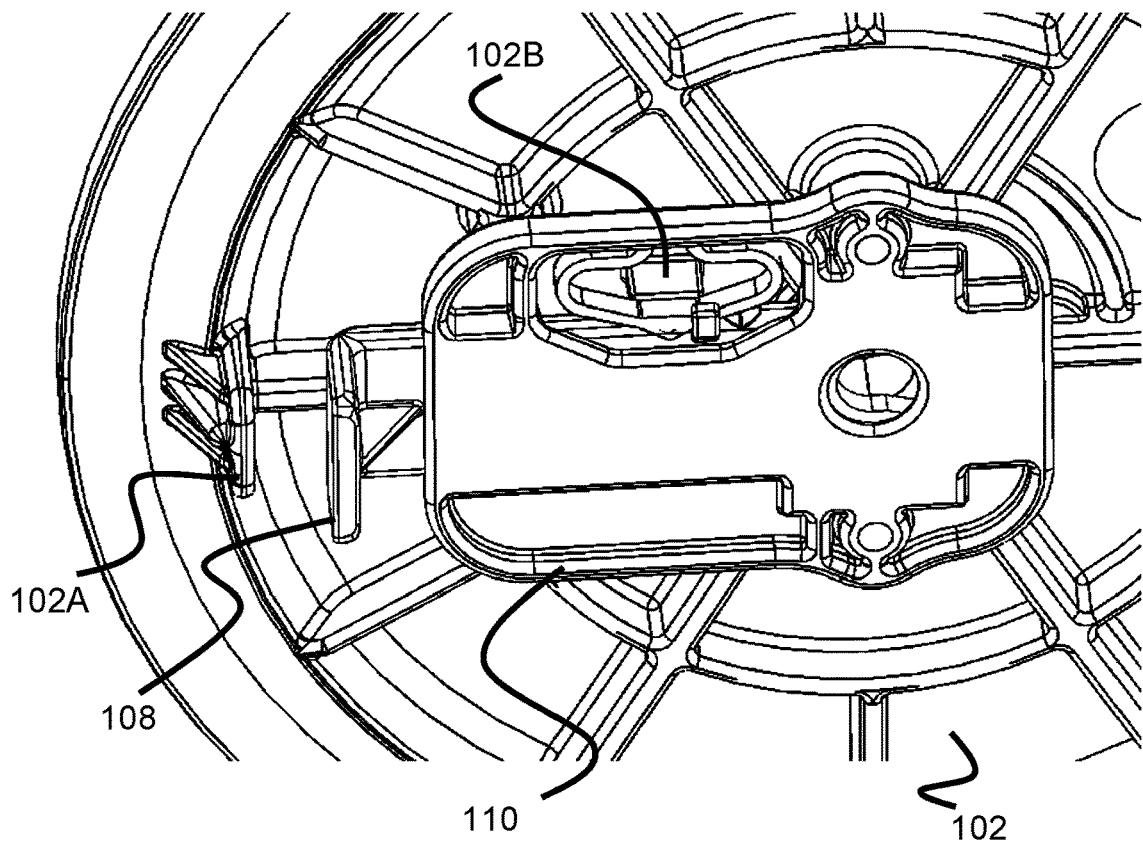
FIG. 7 is a view of a removable cover according to the present invention.
Figure 8:
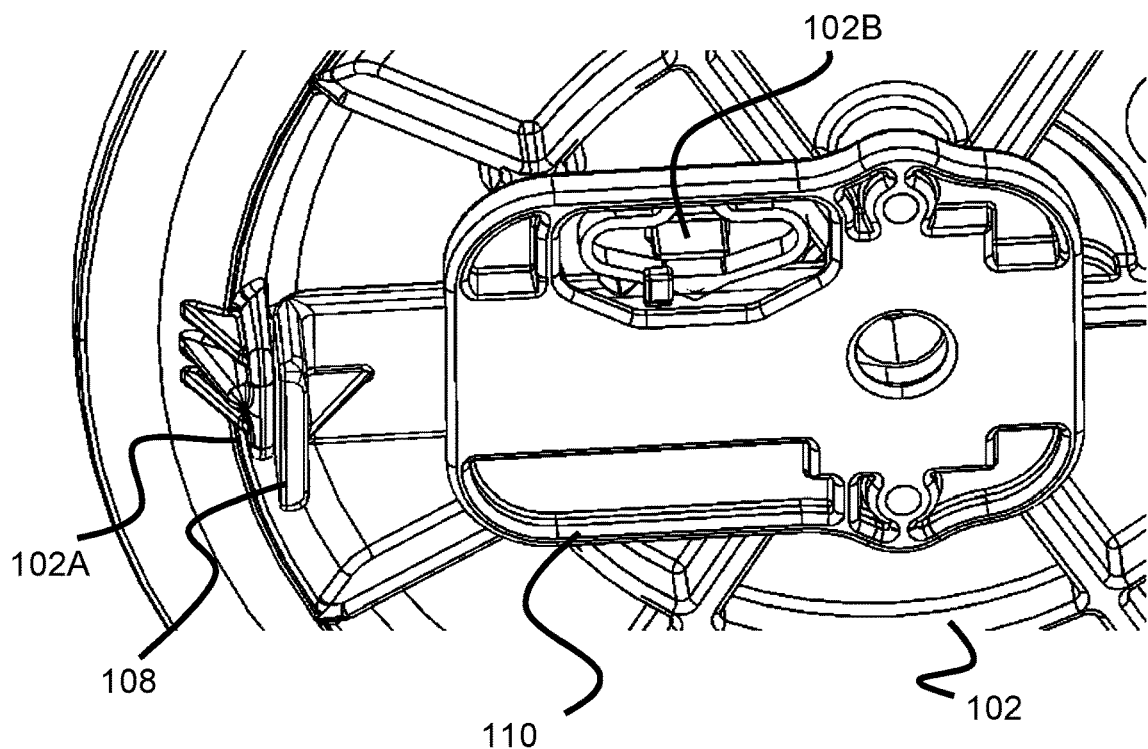
FIG. 8 is a view of a removable cover according to the present invention.
Figure 9:
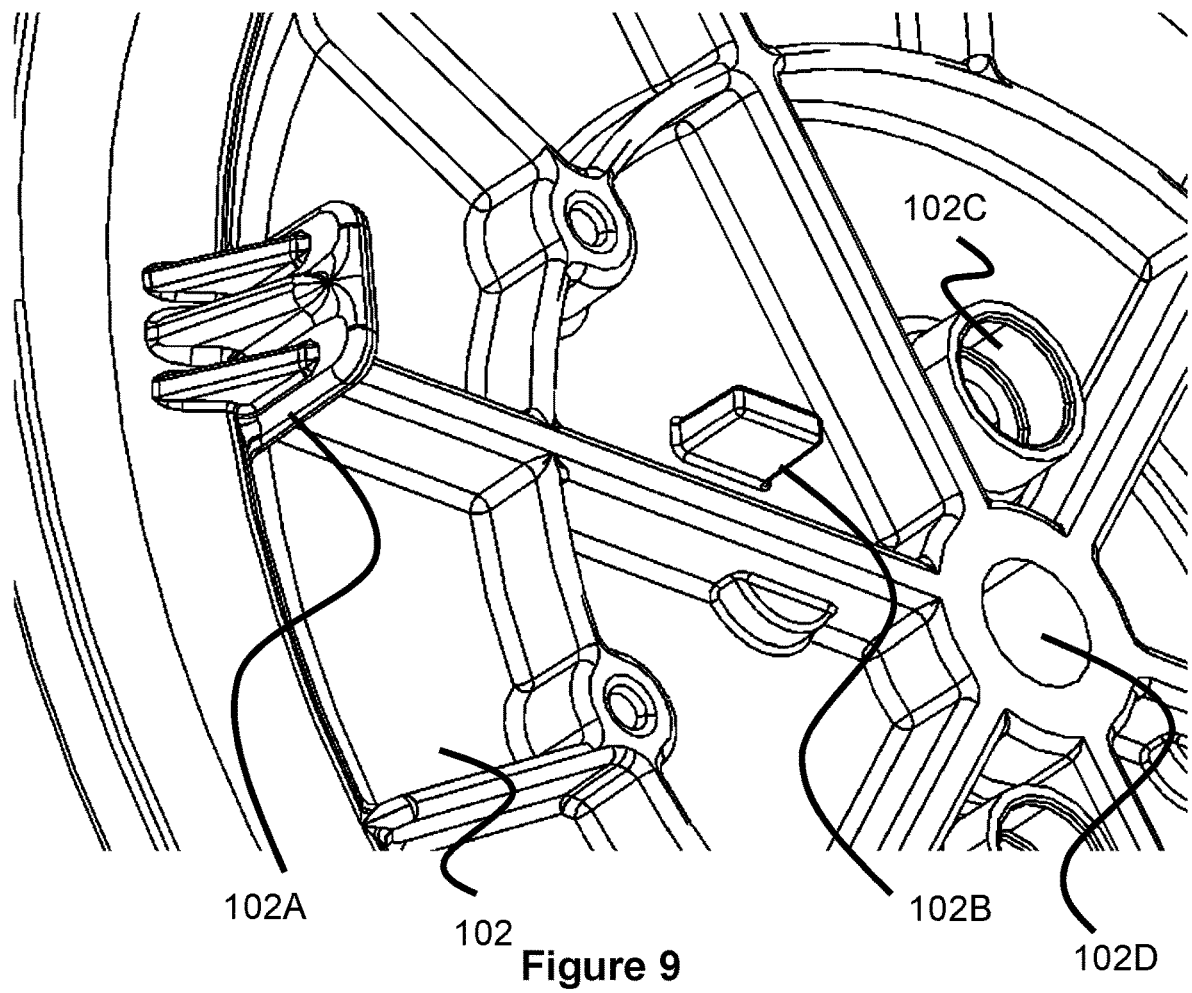
FIG. 9 is a view of a removable cover according to the present invention.
Figure 10:
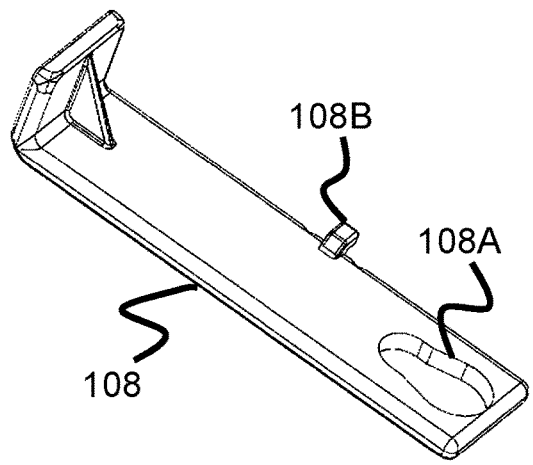
FIG. 10 is a view of a latch member according to the present invention.
Figure 11:
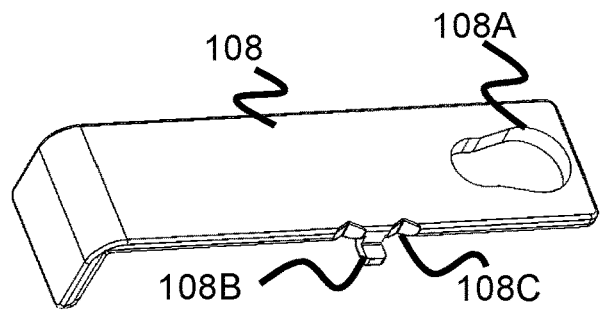
FIG. 11 is a view of a latch member according to the present invention.
Figure 12:
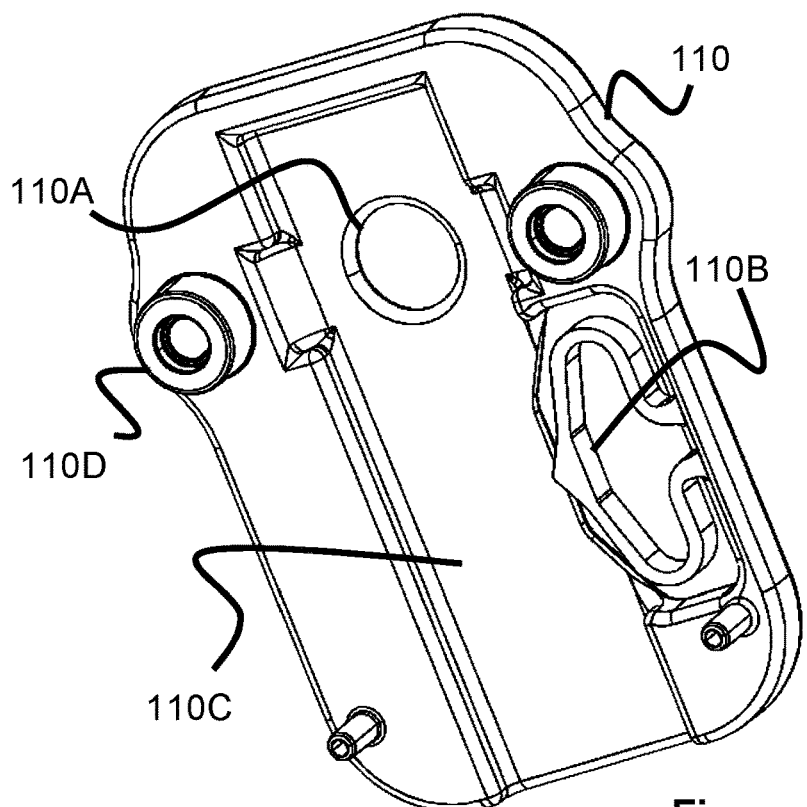
FIG. 12 is a view of a base member according to the present invention.
Figure 13:
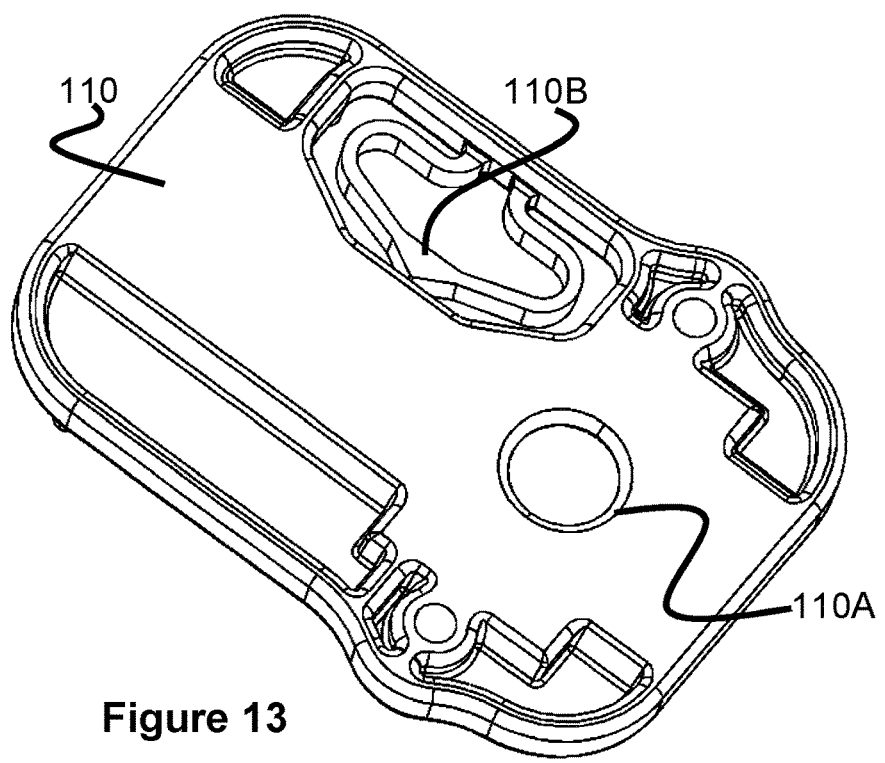
FIG. 13 is a view of a base member according to the present invention.
Figure 14:
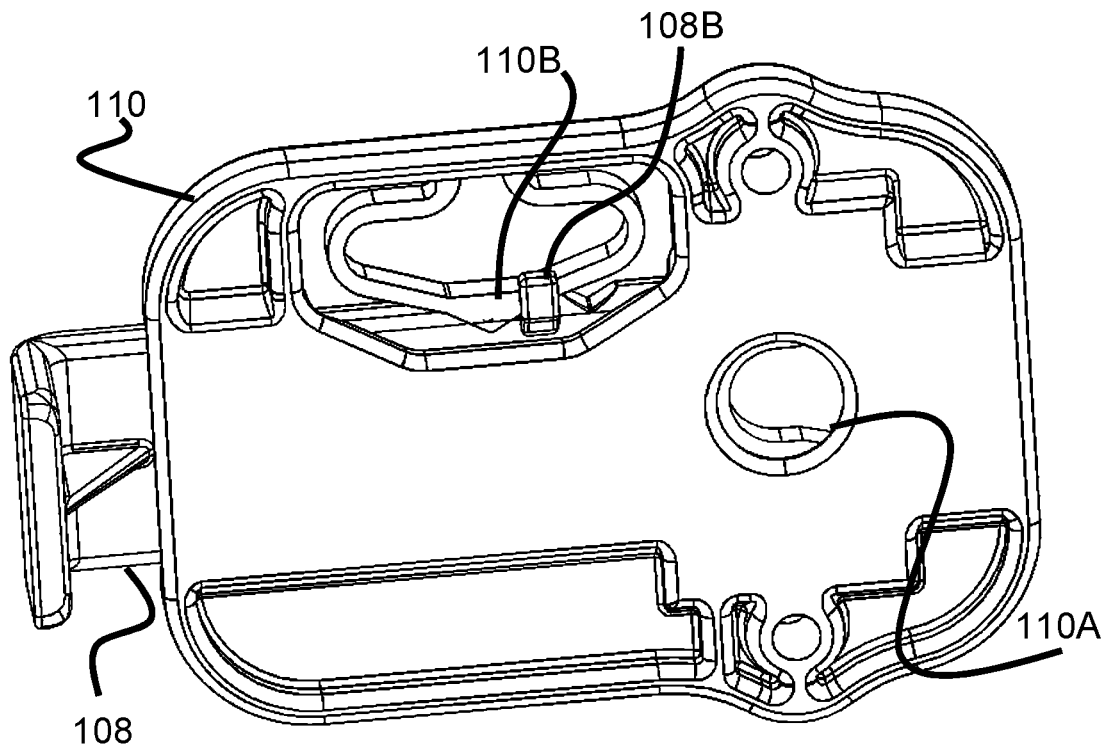
FIG. 14 is a view of a latch mechanism according to the present invention.
Figure 15:
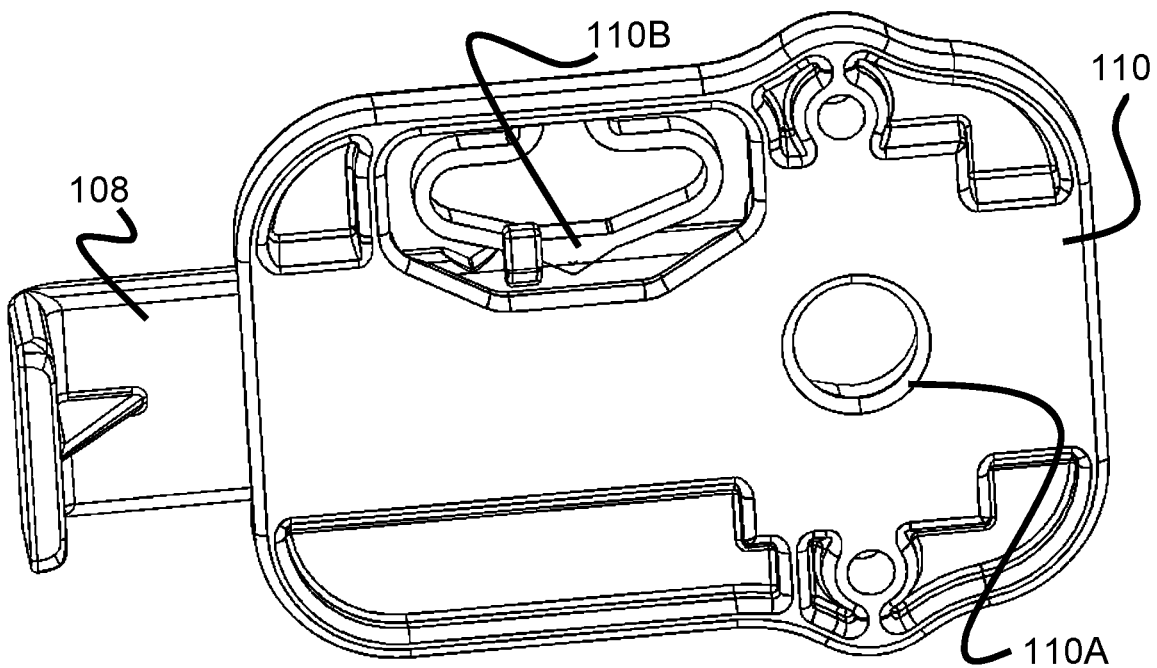
FIG. 15 is a view of a latch mechanism according to the present invention.

In FIGS. 7 and 14, the latch assembly 100 is in the "locked" position and the smaller, reduced-width portion of aperture 108A is aligned with aperture 110A. In FIGS. 8 and 15, the larger, increased-width portion of aperture 108A is aligned with aperture 110A. In this respect, the passage/path through both apertures 108A and 110A increases and decreases in diameter.

Figure 5:
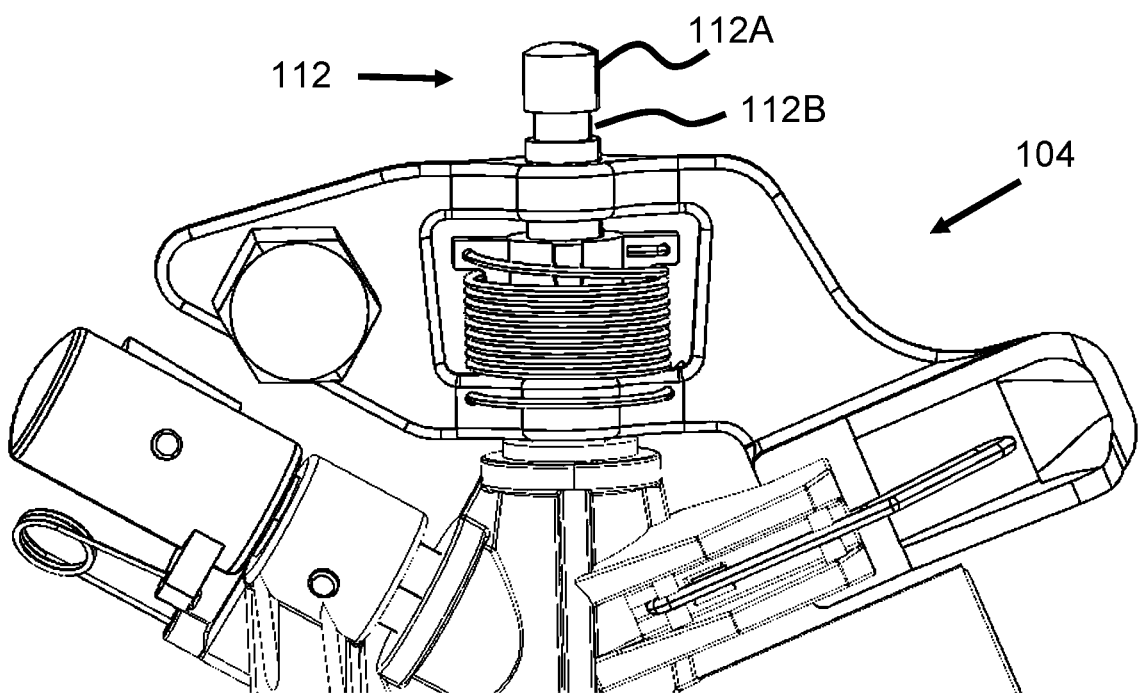
FIG. 5 is a side view of a sprinkler with a removable cover according to the present invention.
Figure 6:
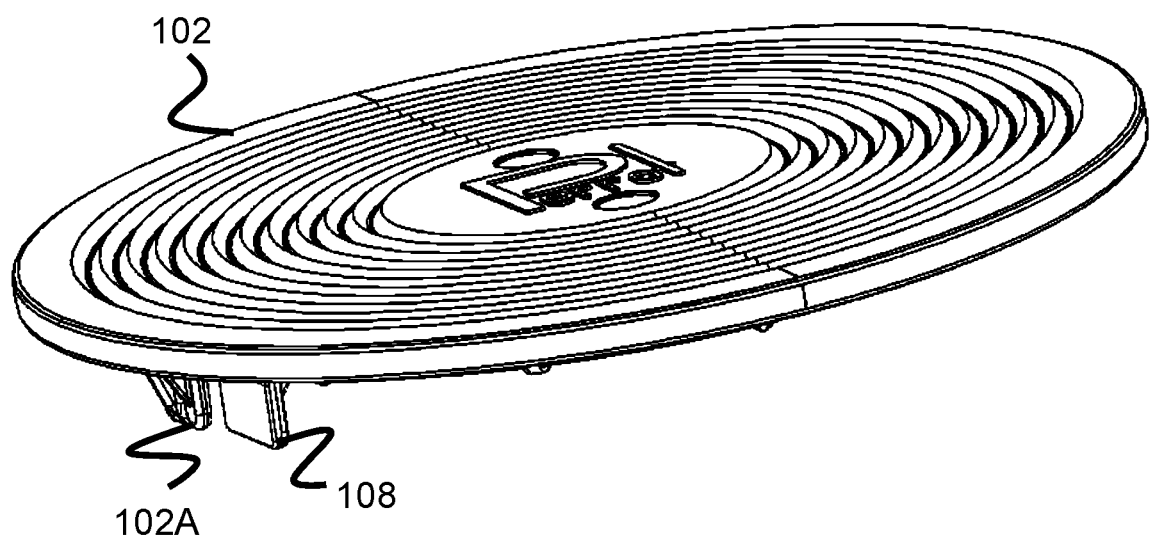
FIG. 6 is a side view of a removable cover according to the present invention.

The cover latch assembly 100 engages and disengages a vertically-mounted post 112 on a top of the nozzle assembly 104, as seen in FIG. 5. The post 112 includes a top region 112A and a lower region 112B that is smaller in diameter than the top region 112A. When the latch assembly 100 is in its "unlocked" position (i.e., the latch member 108 is moved radially outward towards stop 102A), the aperture of the latch assembly 100 is enlarged sufficiently to move over the top region 112A of the post 112. When the latch assembly 100 is in its "locked" position (i.e., the latch member 108 is moved radially inward away from stop 102A), the aperture of the latch assembly 100 is reduced in size sufficiently to prevent the top region 112A of the post 112 from passing through. In this respect, the lid 102 can be latched on to or unlatched from the post 112, solely by movement of the latch member 108. Optionally, the cover 102 may include a center cylindrical recess 102D (FIG. 9) that is aligned with apertures 110A and 108A so that this area can accommodate a top portion of the post 112, if necessary.

Figure 16:
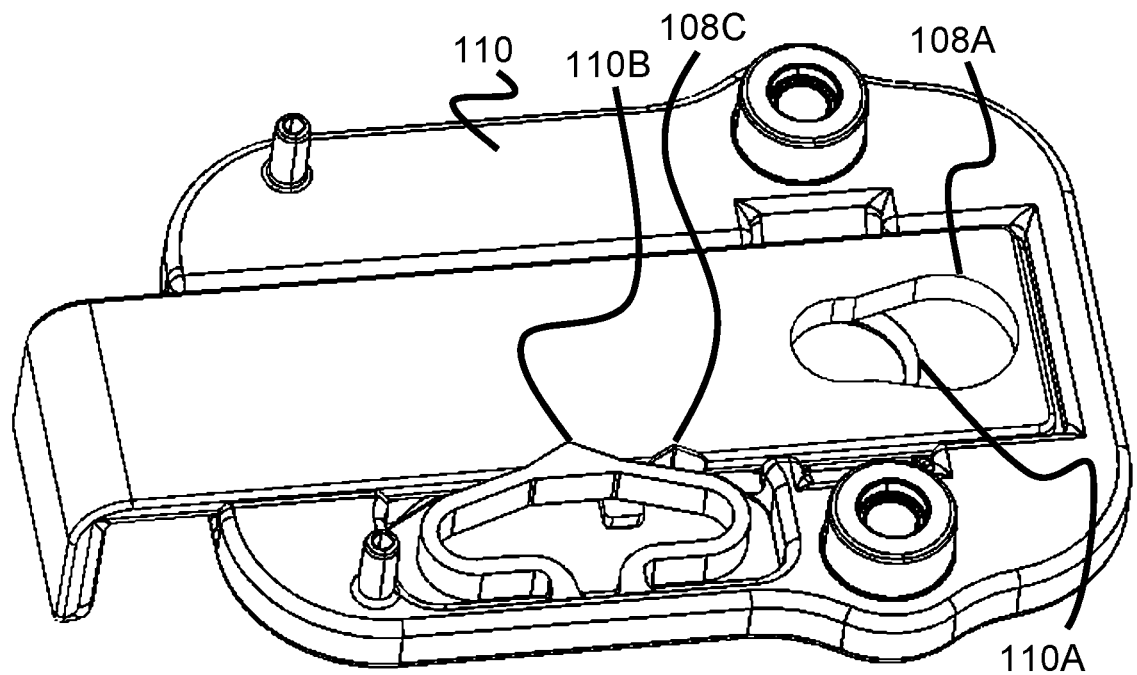
FIG. 16 is a view of a latch mechanism according to the present invention.
Figure 17:
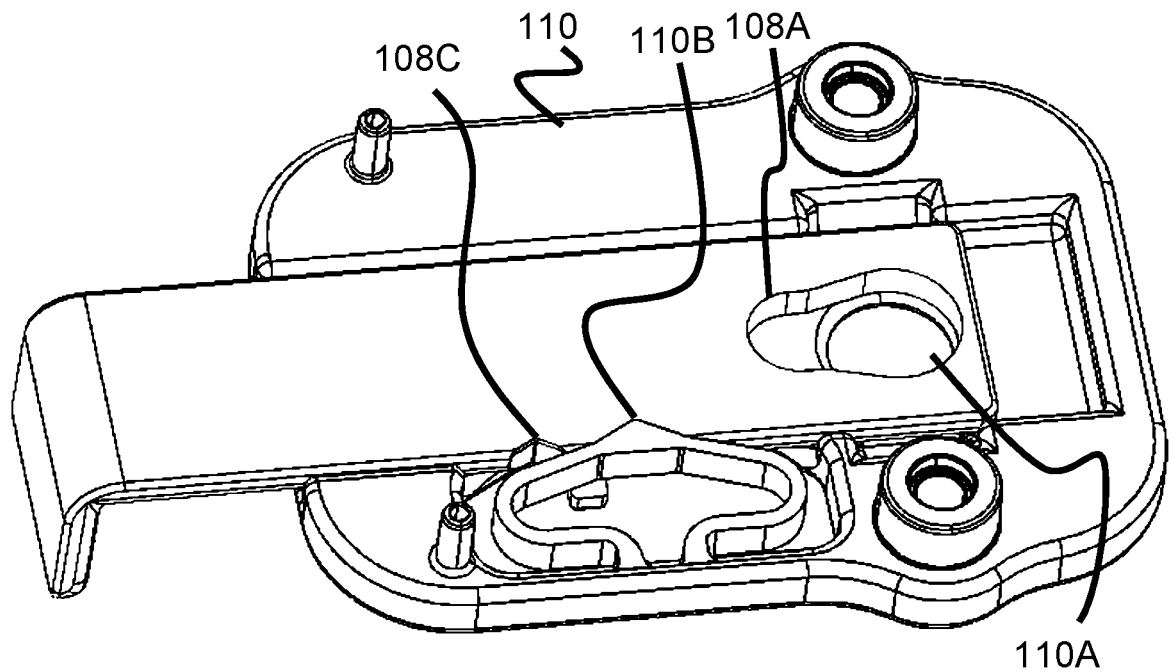
FIG. 17 is a view of a latch mechanism according to the present invention.

As best seen in FIGS. 15-17, the latch assembly 100 also includes a detent assembly for holding the latch member 108 in one of two positions (i.e., the locked or unlocked position). This detent assembly includes a loop 110B located within an aperture or side space of the fixture 110 and that has a triangular point positioned towards the latch member 108. The latch member has two triangular indentations 108C on its side and that have a triangular shape to match the point of the loop 110B. Hence, the triangular point can fit within either of the two indentations 108C. The loop 110B can move/bend a small distance laterally within the aperture of the fixture 110, so that when the latch member 108 is pushed or pulled, the loop 110B moves enough to allow its point to move out of one of the indentations 108C and onto an adjacent indentation 108C. In this respect, the latch member 108 will "click" or lock into the locked or unlocked position.

To prevent the loop 110B from moving downwards and underneath the latch member 108, the latch member preferably includes a retaining tab 108B that extends from its underside so as to contact and support an underside of the loop 110B. Additionally, as seen best in FIGS. 7-9, a rectangular retaining tab 102B can extend downwards from the bottom of the cover 102 and through the loop 110B to limit the lateral distance the loop 110B can move away from the latch member 108.

As best seen in FIGS. 10-12 and 14, the fixture 110 also includes a rectangular depression 110C to accommodate the latch member 108 and allow it to horizontally slide. The latch member 108 preferably has an elongated rectangular shape with an outer end forming a generally right angle that is sized sufficiently for contact with a user's fingers.

Figure 18:
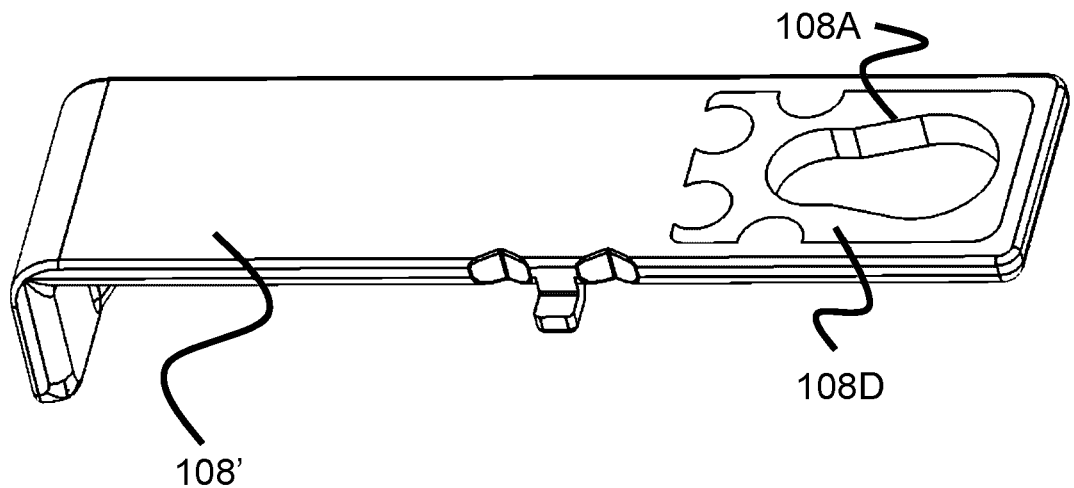
FIG. 18 is a view of a latch member according to the present invention.
Figure 19:
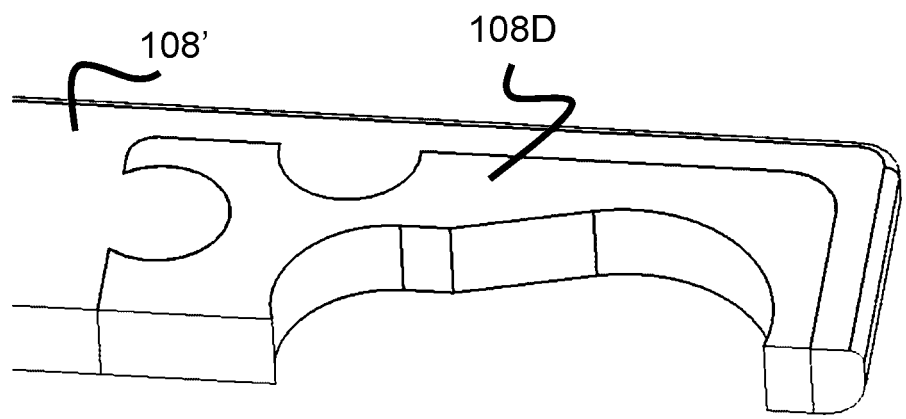
FIG. 19 is a view of a latch member according to the present invention.

FIG. 18 and the cross-sectional view in FIG. 19 illustrate an alternate embodiment of a latch member 108' that is similar to the previously described plastic latch member 108, but includes a metal portion 108D that forms the aperture 108A. Preferably, this metal portion is composed of stainless steel and can be over molded via injection molding to form the remaining plastic portion of the body. To help retain the metal portion 108D with the remaining plastic portion, the metal portion 108D may include curved or concave regions. Since covers with turf cups or artificial turf on them can be somewhat heavier than the cover alone, the metal portion 108D provides added strength that can be especially helpful to withstand the often abrupt pop up processes when irrigation begins (especially when the sprinkler encounters a water hammer.

The base plate 110 can be connected to the cover 102 via two recessed cylindrical regions 102C (FIG. 9) into which the two raised cylindrical members 110D (FIG. 12) can fit into. These shapes can be retained together via screws or via mating physical shapes that "snap" together.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A sprinkler comprising:
   a sprinkler body;
   a nozzle assembly configured to rise from and lower within said sprinkler body;
   a cover,
   a latching mechanism located beneath said cover; said latching mechanism comprising an elongated latch member horizontally slidable between a first position and a second position and having a handle portion extending downward from a bottom of said cover, said latching mechanism selectively engaging and disengaging said cover from a top of said nozzle assembly; and said elongated latch member being movable by a user between said first position and said second position from beneath said cover; wherein horizontally sliding said elongated latch member between said first position and said second position changes a shape of a passage through said latching mechanism;
   and a vertical post, wherein the vertical post is configured to be positioned within the passage when the cover is engaged with the nozzle assembly.

2. The sprinkler of claim 1, wherein said handle portion extends perpendicularly from said elongated latch member.

3. The sprinkler of claim 2, wherein said latching mechanism includes a base plate fixture that is fixed to an underside of said cover; and wherein said elongated latch member is engaged with and slides relative to said base plate fixture.

4. The sprinkler of claim 3, wherein said passage of said elongated latch member includes a first aperture having a first portion with a first aperture width and a second portion having a second aperture width that is larger than said first aperture width.

5. The sprinkler of claim 4, wherein said base plate fixture comprises a second aperture that is aligned with said first aperture.

6. The sprinkler of claim 5, further comprising a detent mechanism engaged with said elongated latch member so as to provide a detent when said elongated latch member is in a first position and in a second position.

7. The sprinkler of claim 6, wherein said handle portion is positioned near an edge of said cover; and wherein said elongated latch member is horizontally slidable towards said edge of said cover.

8. The sprinkler of claim 4, wherein said elongated latch member includes a metal portion surrounding said first aperture.

9. A sprinkler comprising:
a sprinkler body;
a nozzle assembly configured to rise from and lower within said sprinkler body;
and,
a cover; and,
a latching mechanism having a latch member located under said cover and being horizontally movable between a first position in which said cover is engaged with said nozzle assembly and a second position in which said cover is disengaged and removable from said nozzle assembly;
wherein said latch member comprises a vertical handle portion extending downward from a bottom of said cover;
wherein said latch member is elongated, has a first aperture therethrough at a first end, and said vertical handle portion located at a second end;
wherein said first aperture of said latch member has a first portion with a first width and a second portion with a second width smaller than said first width,
and wherein the first portion has a central axis and the second portion has a second central axis and the central axes are spaced apart and parallel to each other.

10. The sprinkler of claim 9, further comprising a base plate connected to an underside of said cover; said base plate having a channel in which said latch member is slidingly engaged within.

11. The sprinkler of claim 9, further comprising a vertical post positioned on said nozzle assembly; said vertical post having a top portion having a first diameter and a lower portion having a second diameter smaller than said first diameter.

12. The sprinkler of claim 11, wherein said first diameter of said top portion of said vertical post that can fit through said first portion of said latch member but not through said second portion.

13. The sprinkler of claim 12, wherein said latching mechanism further comprises a detent mechanism that detents when said latch member is moved to said first position or to said second position.

\* \* \* \* \*